July 19, 1966 S. S. WULC 3,261,904

TRANSISTOR MOUNTING AND HEAT TRANSFER APPARATUS WITH
ADJUSTABLE PRESSURE DETACHABLE MOUNTING MEANS

Filed Sept. 16, 1963

INVENTOR
STANLEY S. WULC

BY Paris, Haskell & Levine
ATTORNEYS 3,261,904

TRANSISTOR MOUNTING AND HEAT TRANSFER APPARATUS WITH ADJUSTABLE PRESSURE DETACHABLE MOUNTING MEANS

Stanley S. Wulc, Rydal, Pa., assignor, by mesne assignments, to United Aircraft Corporation, a corporation of Delaware

Filed Sept. 16, 1963, Ser. No. 309,257
9 Claims. (Cl. 174—15)

Figures 1, 2:
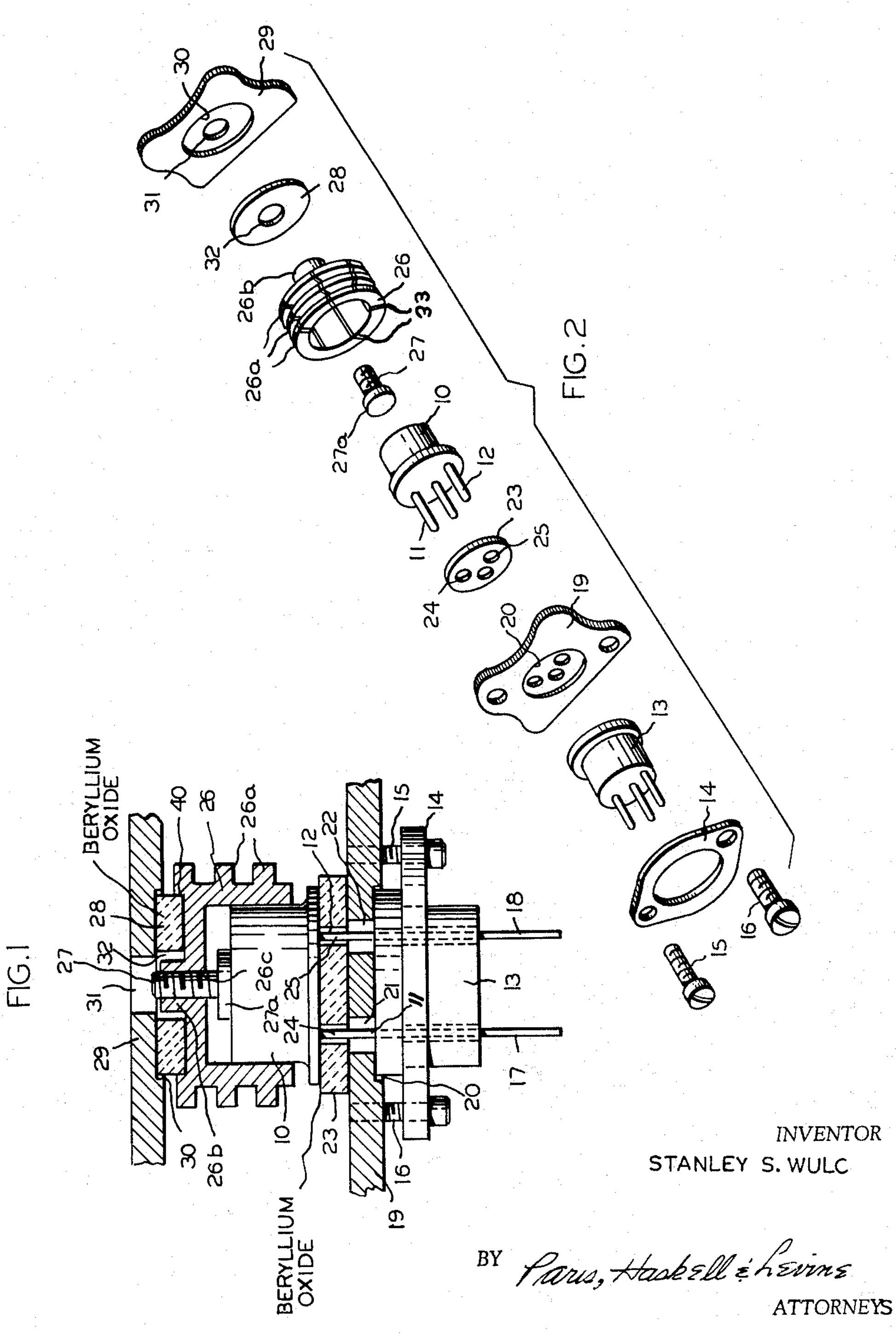

This invention generally relates to improvements in the manner of supporting and dissipating heat from transistors, and more particularly to detachable heat dissipating supports for such purposes that are adjustable to optimize the heat transfer from the transistors to a heat sink.

In the past numerous forms of heat dissipating supports have been devised for rigidly mounting and cooling transistors, ranging from those special constructions that are integrally formed within or without the transistor housing and therefore useful only for special purposes, to the many types that are in the nature of clamps and heat dissipators that are detachably engageable with conventional transistors and therefore universally usable with different types of transistors. The present invention is concerned with those detachable types of transistor mountings that are useful with many different varieties of transistors as are obtainable on the open market.

Very generally according to the present invention, there is provided a detachable transistor mounting and heat dissipator construction that provides a maximized area of surface contact with the transistor housing and with the heat sink, thereby to both improve the support of the transistor as well as dissipate the maximum amount of heat being produced. The interconnections between the mounting, the transistor, and the heat sink are made adjustable, such that the contacting surface of these members may be placed under a greater or lesser pressure to improve the heat transfer therebetween. This adjustable pressure construction also provides a more rigidized mounting of the transistor as is desired.

It is accordingly a principal object of the invention to provide a detachable mounting for transistors that provides a maximum contact with the transistor housing to improve the heat dissipation and structural support of the transistor.

A further object is to provide such a mounting wherein the conductive heat transferring surfaces interconnecting the mounting with a chassis panel or other heat sink support are made adjustable under pressure to obtain an improved thermal heat transfer as well as to provide more rigid support of the transistor.

A still further object is to provide what might best be termed a sandwich type mounting construction for transistors wherein an adjustable pressure is exerted between the transistor and the surrounding heat transfer surfaces of the mounting to improve the heat transfer characteristics as well as the structural support of the transistor.

Other objects and many additional advantages will be more readily understood by those skilled in the art after a detailed consideration of the following specification taken with the accompanying drawings wherein:

FIG. 1 is a side view, partly in section, and illustrating one preferred transistor mounting construction according to the invention, and FIG. 2 is a perspective view, illustrating the component parts of this mounting construction in exploded relationship.

Referring to the drawings for a detailed consideration of one preferred embodiment of the invention, there is shown in FIG. 1 a transistor 10 of more or less conventional construction and having an outer housing in the shape of a small cylindrical hollow container of metal that is closed at the top and terminated in a flange at the base. As is also conventional, the housing is hermetically sealed, and is provided with a series of conductors, such as 11 and 12, projecting from its base and adapted to interengage with a conventional transistor socket 13 having pin type receptacles to receive the transistor conductors 11 and 12.

According to the present invention, the mounting structure to be described, provides a sandwich type support of the transistor housing 10 between a lower heat sink panel 19 and an upper heat sink support panel 29, that is spaced from and rigidly fastened in a suitable manner to the lower panel 19. When the transistor is to be mounted within a small container module, such as is described in applicant's prior Patent 3,029,368, the upper panel 29 may be a cover over the chassis container that is assembled and rigidly fastened to close the module after the circuitry is inserted and interconnected.

Alternatively, if the transistor 10 is to be mounted on a flat panel or the like, the upper support 29 may be an L-shaped or T-shaped bracket (not shown) that is bolted or otherwise attached in a rigid manner with respect to the base panel 19, and is provided with an under surface that is substantially parallel to and spaced from the lower panel 19.

For providing maximum heat conductivity and heat radiation away from the transistor housing 10, the mounting structure includes a coaxially disposed hollow cylindrical sleeve member 26 whose sides are slotted to provide a series of resilient fingers 33 or arms for slideably engaging the sides of the housing 10, as shown. The sides of the sleeve 26 are also provided with integrally formed ribs **26*a* which serve as radiating fins to radiate heat. The sleeve 26 is telescopically press fitted over the housing 10, and is provided with a centrally disposed hub 26*b* having a threaded opening or aperture 32 therein to receive an adjusting screw 27 having a flattened end portion or disc 27*a* adapted to bear against the top of the housing 10 as shown in FIG. 1. By advancing the screw 27 through the sleeve, the disc 27*a* engages and bears against the housing 10 and, in turn, slideably displaces the sleeve 26 upwardly toward the upper panel 29**.

Above the sleeve 26, and being sandwiched between the sleeve and the underside of panel 29, there is provided an annular washer 28 of a material having a high thermal conductivity and low electrical conductivity, such as beryllium oxide, to provide an electrical insulation layer between these members, yet permit thermal conduction of heat therebetween.

As shown in FIG. 2, the upper panel 29 is preferably recessed at 30 to recieve the washer 28 and prevent it from displacement sideways, and the upper surface of the sleeve 26 is also slightly recessed at 40 for the same purpose, as indicated in FIG. 1. The annular washer 28 is provided with a central opening at 32, as is the panel 29 at opening 31, both being in axial alignment with the head of the adjusting screw 27 for enabling the insertion of a screwdriver or the like therethrough for adjusting the screw 27. As is shown in FIG. 1, the opening 32 in washer 28 is large enough to receive the hub **26*b* of sleeve 26** when the members are assembled.

Below the base flange of the transistor housing 10 and being sandwiched between the housing and the lower panel 19, there is provided a second washer 23 of high thermal conductivity and low electrical conductivity such as of the same material as washer 28 described above. This second washer 23 is provided with a series of openings, such as 24 and 25, disposed in alignment with the terminal conductors 11 and 12 of the transistor 10, and with each opening being slightly larger in diameter than these conductors so that the conductors 11 and 12 may pass through as shown in FIG. 1. The lower panel 19 is also provided with larger openings 21 and 22 in alignment with the washer openings 24 and 25 for permitting the transistor conductors 11 and 12 to project through the washer 23 and lower panel 19 and interengage with the pin receptacles 17 and 18 of the transistor socket 13.

The transistor socket 13 is, in turn, mounted beneath the lower panel 19 within a recess 20 being provided therein, and is rigidly supported in place by means such as bolts 15 and 16 that are threadably engaged with the lower panel 19 as shown, or alternatively passed therethrough and are held in place by nuts, if desired.

As discussed above, the upper and lower washers 28 and 23 are of high thermally conductive material but having low electrical conductivity. One of the most suitable of such materials is beryllium oxide, sold under the trade name of "Berlox." However, other such materials such as magnesium oxide, aluminum oxide, and beryllia particles dispersed in a bonding cement are other examples of suitable materials that may be used. Since these washers 23 and 28 are the only members in direct contact with the upper and lower heat sink panels 29 and 19, the transistor housing 10 is electrically insulated from these panels, yet thermally is in direct contact therewith.

The sleeve member 26 is preferably of a very high electrical conductivity material, such as copper or various copper alloys, and as noted in FIG. 1, the resilient fingers 33 thereon engage a very extensive surface area about the sides of the transistor housing 10. The upper surface of the sleeve 26 is in direct contact with the upper panel 29 through the upper washer 28, and the base of housing 10 is also in direct contact with the lower panel 19 through the heat conducting washer 23. These members therefore provide direct heat conducting paths from the sides and base of the transistor 10, and the flattened disc 27*a* of the adjusting screw 27 provides a large area contact with the top of the housing 10 and provides an additional heat conducting path through the screw 27 and sleeve 26 to the upper heat sink panel 29. Thus, the housing is substantially completely enclosed by direct heat conduction mediums that lead directly to the upper and lower heat sink panels 29 and 19, respectively.

In addition, the radiating fins or ribs 26*a* provided on the sleeve 26 radiate heat that is conducted to the sleeve 26 from the transistor 10 to further cool the transistor 10, as is desired.

With this construction, the greatest areas of resistance to the flow of heat from the transistor to the heat sink, reside in the respective contacting surfaces between the sleeve 26 and washer 28, the contacting surface between the disc 27*a* and the housing 10, and between the washers 23 and 28 and the upper and lower panels 29 and 19, respectively. For optimizing the heat conduction between these surfaces, the present invention pressurizes the contacting of these members to urge each of the contacting surfaces more tightly against its adjoining surface thereby to increase the actual area contact and provide an improved heat transfer path. This is performed, as generally indicated above, by threading the adjusting screw 27 forwardly through the hub 26*b* of sleeve 26 to bear against the transistor housing 10 with increased pressure. The resulting increased downward pressure exerted by the disc 27*a* against the housing, urges the housing 10 downwardly against the washer 23 and, in turn, urges the washer 23 downwardly against the surface of the lower panel 19. The equal and opposite reaction force exerted upwardly on the disc 27*a* of screw 27 is transmitted against the sleeve 26, pushing the sleeve upwardly against the washer 28 which, in turn, is thereby urged more tightly against the upper panel 29. Since the fingers 33 of the sleeve 26 slideably engage the sides of the transistor housing 10, the sleeve may slide upwardly over the sides of the housing as the screw 27 is advanced.

To prevent the sleeve 26 from rotating with respect to the housing 10 as the adjusting screw 27 is advanced, the resilient arms 33 of the sleeve rather tightly engage the sides of the housing 10, and, if desired, a suitable stop means may also be employed to prevent rotation of the sleeve on the housing while permitting axial sliding as discussed above.

The complete construction is both easily assembled or disassembled, as desired. During assembly, the screw 27 is initially threaded upwardly so that its base or disc 27*a* is raised to the underside of the upper wall of the sleeve 26, and the sleeve is then press-fitted onto the housing 10 and depressed to its maximum extent. The lower and upper washers 23 and 28 are then placed under the transistor base and over the top of the sleeve, and the transistor 10 is mounted on the lower panel by inserting its conductors 12 and 13 through the openings 21 and 22 in the panel 19 to engage with the transistor socket 13. If the upper panel 29 is a cover over a chassis module, it is then inserted over the washer 28 to close the module, and is rigidly fastened in place. The screw 27 is then advanced through the sleeve 26, by means of a screw driver inserted through the aligned holes 31 and 32 in the panel 29 and washer 28 respectively, until the disc 27*a* bears tightly against the top of the housing 10 and pressurizes the assembly of washers 28 and 23 and sleeve 26 as discussed above.

In the event that the upper panel 29 is a separate support or bracket rather than a cover for a module, the procedure is substantially the same, and after the transistor 10 and its associated sleeve 26 and washers 23 and 28 are mounted on the lower panel 19, the upper support 29 is inserted and fastened with respect to the lower panel 19 prior to pressurizing the structure by advancing the screw 27 through the sleeve 26.

It is to be noted that the transistor socket 13 is disposed underneath the lower panel 19. The purpose of this construction is to enable the base of the transistor 10 to be placed in direct contact with the heat conducting washer 23 and, in turn, with the lower panel 19 constituting a heat sink. The transistor socket 13 is normally of a plastic or other poor thermally conductive material, and accordingly this arrangement of parts improves the conduction of heat from the lower portions of the transistor housing 10.

Due to the fact that the upper washer 28 is recessed within both the upper panel 29 and the sleeve 26, the mounting structure prevents transverse movement of the transistor or its mounting parts, and consequently this pressurized sandwich construction very rigidly supports the transistor between the pair of upper and lower panels 29 and 19.

As is believed evident from those skilled in the art, many changes may be made in the detachable transistor mounting and heat dissipating structure as described above without departing from the spirit and scope of this invention. Accordingly, this invention is to be considered as being limited only on the following claims appended hereto.

What is claimed is:

1. A detachable heat conducting mounting for fastening a transistor housing on a heat sink comprising: a support of high thermal conductivity that is rigidly mounted with respect to the heat sink and having a portion spaced therefrom, a heat conducting member having a low electrical conductivity disposed between the transistor housing and one of the heat sink and spaced portion of said support, and adjustable means for exerting a variable pressure between said housing and the other one of said heat sink and spaced portion of said support to variably increase the surface contact pressure and thermal conductivity between the heat conducting member and the housing.

2. A detachable heat conducting mounting for fastening a transistor housing on a heat sink comprising: a support of high thermal conductivity that is rigidly mounted with respect to the heat sink and having a portion spaced therefrom, a heat conducting member disposed between the housing and heat sink and having a low electrical conductivity, and adjustable means for exerting a variable pressure between said housing and said spaced portion of said support to adjustably increase the surface contract pressure between the housing, heat conducting member, and heat sink.

3. A detachable heat conducting mounting for fastening a transistor housing on a heat sink comprising: a support member of high thermal conductivity having a portion that is rigidly mounted with respect to the heat sink and spaced therefrom, a first heat conducting member having a low electrical conductivity being disposed between the housing and heat sink, a second heat conducting member having a low electrical conductivity being disposed between the housing and the spaced portion of said support, and adjustable means for exerting a variable pressure between the housing and both of said heat conducting members thereby to increase the heat conductivity from the housing to both heat conducting members and to the heat sink and support member.

4. A detachable heat conducting mounting for fastening a transistor housing on a heat sink having two spaced portions comprising: a sleeve member for slideably engaging the sides of the transistor housing, a first heat conducting member having a low electrical conductivity being sandwiched between said sleeve member and one of said portions, a second heat conducting member having a low electrical conductivity being sandwiched between said housing and the other of said spaced portions, and adjustable means for exerting a variable pressure between said housing and sleeve to more tightly sandwich the two heat conducting members between the housing and said two spaced portions of the heat sink, and concurrently rigidize the mounting of the transistor between said two spaced portions of the heat sink.

5. A detachable sandwich construction for mounting a transistor housing between a heat sink and a support member rigidly associated therewith and having portions spaced therefrom comprising: a member of high thermal and electrical conductivity slideably engaging in extensive area of the surface of the transistor housing, a thermal conductor of low electrical conductivity being sandwiched between the member and the spaced portion of the support member, a second thermal conductor having low electrical conductivity being sandwiched between the housing and the heat sink, and adjustable means for exerting a variable pressure between the housing and member thereby to concurrently increase the pressure contact between the spaced portion of the support member, the thermal conductor, and the housing and also the pressure contact between the housing, the second thermal conductor, and the heat sink.

6. In the apparatus of claim 5, said adjustable means comprising: a pressure exerting stop member being threadably engaged with said member and contacting said housing thereby to provide increased pressure on the housing as the stop means is advanved against the housing.

7. A detachable heat conducting mounting for fastening a transistor housing between two rigidly interconnected spaced portions of a heat sink comprising: a sleeve member of high thermal and electrical conductivity slideably engaging an extensive surface area of the transistor housing, a first thermal conductor plate of low electrical conductivity being sandwiched between the end of said sleeve and one of said spaced portions, a second thermal conductor plate of low electrical conductivity being sandwiched between the base of said housing and the other portion of said heat sink; said sleeve member, conductor plate, second conductor plate, and housing being axially aligned and having portions of the surfaces thereof in parallel with one another and with paralleled disposed surfaces of the heat sink and support, and adjustable means for variably displacing the sleeve from the transistor housing along said axis to more tightly compress the surfaces of the second and first conductor plates between the respective surfaces of the heat sink and housing and between the sleeve and support member, respectively.

8. A detachable heat conducting mounting for fastening a transistor housing between two spaced portions of a heat sink and providing heat conductive transfer from all of the sides, top, and bottom of the housing comprising: a sleeve slidably engaging the sides of the housing and supported with respect to one of the speced portions of the heat sink to provide thermal heat conduction therebetween, a thermal conductor of low electrical conductivity disposed between the base of the housing and the other spaced portion of the heat sink to provide thermal conductivity therebetween, adjustable means interengaging the top of said housing and in thermal conducting relationship with the sleeve, said adjustable means exerting an adjustable pressure between the top of said housing and the sleeve for jointly exerting a pressure between the top of said housing and said one spaced portion of the heat sink together with pressure between the base of said housing and the other spaced portion of the heat sink through said heat conductor, thereby to rigidly wedge the housing with respect to the two spaced portions of the heat sink.

9. In the mounting of claim 8, said heat sink comprising a base and a separate support member rigidly attached thereto, said separate support having a portion spaced from the base member.

References Cited by the Examiner

UNITED STATES PATENTS

| | | | |
|---|---|---|---|
| 2,879,977 | 3/1959 | Trought. | |
| 2,922,935 | 1/1960 | Dolder | 174—52 X |
| 3,146,384 | 8/1964 | Ruehle. | |

FOREIGN PATENTS

| | | |
|---|---|---|
| 659,585 | 3/1963 | Canada. |
| 802,429 | 10/1958 | Great Britain. |
| 921,251 | 3/1963 | Great Britain. |

LEWIS H. MYERS, *Primary Examiner.*

JOHN F. BURNS, ROBERT K. SCHAEFER, *Examiners.*

J. F. RUGGIERO, *Assistant Examiner.*